(12) United States Patent
Kobayashi et al.

(10) Patent No.: US 8,099,551 B2
(45) Date of Patent: Jan. 17, 2012

(54) STORAGE DEVICE CONTROLLER WITH A PLURALITY OF I/O PROCESSORS REQUESTING DATA FROM A PLURALITY OF STRIPE UNITS OF A LOGICAL VOLUME

(75) Inventors: Naotaka Kobayashi, Odawara (JP); Kunihito Matsuki, Odawara (JP); Hiroshi Ogasawara, Odawara (JP); Youichi Gotoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/889,559

(22) Filed: Sep. 24, 2010

(65) Prior Publication Data
US 2011/0029732 A1 Feb. 3, 2011

Related U.S. Application Data

(63) Continuation of application No. 11/375,113, filed on Mar. 15, 2006, now abandoned.

(30) Foreign Application Priority Data

Jan. 13, 2006 (JP) ................................. 2006-006583

(51) Int. Cl.
*G06F 12/00* (2006.01)
*G06F 13/00* (2006.01)
*G06F 13/28* (2006.01)
(52) U.S. Cl. ......... 711/114; 711/171; 711/202; 711/214
(58) Field of Classification Search .................. 711/112, 711/114
See application file for complete search history.

(56) References Cited

U.S. PATENT DOCUMENTS

| | | | |
|---|---|---|---|
| 5,557,770 A | 9/1996 | Bhide et al. | |
| 5,974,503 A | 10/1999 | Venkatesh et al. | |
| 6,029,226 A | 2/2000 | Ellis et al. | |
| 6,757,753 B1 | 6/2004 | DeKoning et al. | |
| 7,047,357 B1 | 5/2006 | Akiyama | |
| 7,080,212 B1 | 7/2006 | Hsu et al. | |
| 2002/0133735 A1 | 9/2002 | McKean et al. | |
| 2004/0205294 A1 | 10/2004 | Nakayama et al. | |
| 2005/0038940 A1 | 2/2005 | Ido et al. | |
| 2005/0114615 A1 | 5/2005 | Ogasawara et al. | |
| 2005/0223171 A1 | 10/2005 | Kanai | |
| 2007/0168610 A1 | 7/2007 | Kobayashi et al. | |

FOREIGN PATENT DOCUMENTS
JP 2005157713 6/2002

*Primary Examiner* — Brian Peugh
*Assistant Examiner* — Prasith Thammavong
(74) *Attorney, Agent, or Firm* — Brundidge & Stanger, P.C.

(57) ABSTRACT

Provided is a storage controller capable of improving the access performance to the storage device by preventing an I/O access request to the storage device from being concentrated on certain I/O processors among a plurality of I/O processor, and causing the plurality of I/O processors to issue the I/O access request in a well balanced manner. With this storage control system, a plurality of stripe units are formed by striping the logical volume into a stripe size of an arbitrary storage capacity, and information regarding which I/O processor among the plurality of I/O processors will output the I/O request to which stripe unit among the plurality of stripe units is stored as the control information in the memory.

10 Claims, 12 Drawing Sheets

FIG.9

| | | STRIPE POSITION | SG1 | SG2 | SG3 | SG4 |
|---|---|---|---|---|---|---|
| EVEN NUMBERED OBSTRUCTION | LU NUMBER (ASCENDING ORDER) | LU00 | ~~IOP0~~ | IOP1 | ~~IOP2~~ | IOP3 |
| | | (ORGANIZE DEGENERATION⇒) | IOP1 | IOP1 | IOP3 | IOP3 |
| | | LU01 | IOP1 | ~~IOP2~~ | IOP3 | ~~IOP0~~ |
| | | (ORGANIZE DEGENERATION⇒) | IOP1 | IOP3 | IOP3 | IOP1 |
| | | LU02 | ~~IOP2~~ | IOP3 | ~~IOP0~~ | IOP1 |
| | | (ORGANIZE DEGENERATION⇒) | IOP3 | IOP3 | IOP1 | IOP1 |

| | | STRIPE POSITION | SG1 | SG2 | SG3 | SG4 |
|---|---|---|---|---|---|---|
| RECOVERY | LU NUMBER (ASCENDING ORDER) | LU00 | IOP1 | IOP1 | IOP3 | IOP3 |
| | | (RECOVER CONFIGURATION⇒) | IOP0 | IOP1 | IOP2 | IOP3 |
| | | LU01 | IOP1 | IOP3 | IOP3 | IOP1 |
| | | (RECOVER CONFIGURATION⇒) | IOP1 | IOP2 | IOP3 | IOP0 |
| | | LU02 | IOP3 | IOP3 | IOP1 | IOP1 |
| | | (RECOVER CONFIGURATION⇒) | IOP2 | IOP3 | IOP0 | IOP1 |

| | | STRIPE POSITION | SG1 | SG2 | SG3 | SG4 |
|---|---|---|---|---|---|---|
| ODD NUMBERED OBSTRUCTION | LU NUMBER (ASCENDING ORDER) | LU00 | IOP0 | ~~IOP1~~ | IOP2 | ~~IOP3~~ |
| | | (ORGANIZE DEGENERATION⇒) | IOP0 | IOP0 | IOP2 | IOP2 |
| | | LU01 | ~~IOP1~~ | IOP2 | ~~IOP3~~ | IOP0 |
| | | (ORGANIZE DEGENERATION⇒) | IOP0 | IOP2 | IOP2 | IOP0 |
| | | LU02 | IOP2 | ~~IOP3~~ | IOP0 | ~~IOP1~~ |
| | | (ORGANIZE DEGENERATION⇒) | IOP2 | IOP2 | IOP0 | IOP0 |

| | | STRIPE POSITION | SG1 | SG2 | SG3 | SG4 |
|---|---|---|---|---|---|---|
| RECOVERY | LU NUMBER (ASCENDING ORDER) | LU00 | IOP0 | IOP0 | IOP2 | IOP2 |
| | | (RECOVER CONFIGURATION⇒) | IOP0 | IOP1 | IOP2 | IOP3 |
| | | LU01 | IOP0 | IOP2 | IOP2 | IOP0 |
| | | (RECOVER CONFIGURATION⇒) | IOP1 | IOP2 | IOP3 | IOP0 |
| | | LU02 | IOP2 | IOP2 | IOP0 | IOP0 |
| | | (RECOVER CONFIGURATION⇒) | IOP2 | IOP3 | IOP0 | IOP1 |

FIG.11

| | | | | |
|---|---|---|---|---|
| 0 | QUEUE TYPE | (Rsv) | TAG TYPE | Xeon# |
| 1 | ID | | LUN | |
| 2 | (Reserved) | | TAG# | |
| 3 | (Reserved) | | | OPERATION CODE |
| 4 | CUMULATIVE TL | | TL | |
| 5 | LBA (8 BYTE LBA) | | | |
| 6 | | | | |
| 7 | Xeon LM ADDRESS 1 (8 BYTE ADDRESS) | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |

STORAGE DEVICE CONTROLLER WITH A PLURALITY OF I/O PROCESSORS REQUESTING DATA FROM A PLURALITY OF STRIPE UNITS OF A LOGICAL VOLUME

CROSS-REFERENCES TO RELATED APPLICATION

The present application is a continuation application of application Ser. No. 11/375,113, filed Mar. 15, 2006, now abandoned; which relates to and claims priority from Japanese Patent Application No. 2006-006583, filed on Jan. 13, 2006, the entire disclosure of which is incorporated herein by reference.

BACKGROUND OF THE INVENTION

The present invention generally relates to a storage controller, and in particular relates to a storage controller configuring a plurality of I/O processors in a channel controller.

In recent years, the data volume handled by computer systems is increasing exponentially. As a storage controller; that is, a storage system for managing such data, a large-scale storage system managed by a RAID (Redundant Arrays of Inexpensive Disks) system for providing an enormous storage resource known as midrange class or enterprise class is recently attracting attention. In order to efficiently use and manage such vast amounts of data, technology has been developed for realizing high-speed and extensive access to a storage system by connecting a storage system such as a disk array device and an information processing device via a SAN (Storage Area Network). Meanwhile, a NAS (Network Attached Storage) has also been developed for interconnecting a storage system and an information processing device via a network using a TCP/IP protocol or the like, and realizing access from the information processing device at the file level.

In this type of storage system technology, there is a concept known as a NAS head which integrates SAN and NAS. Here, among the constituent elements of NAS, only the controller unit is removed and used as an independent device. By incorporating this NAS head in a SAN-connected storage apparatus, the NAS function can be incorporated into the storage system. For instance, Japanese Patent Laid-Open Publication No. 2005-157713 describes this type of storage system.

SUMMARY OF THE INVENTION

A NAS board is configured to output an I/O request to a storage device in reply to a data I/O request in file units from an information processing device. The NAS board has a CPU and an I/O processor. The CPU is a processor for making the NAS board function as a NAS. When the CPU receives a file access request from a host connected to a storage system, it creates an I/O request to the file access request, and outputs this from the I/O processor to the storage device.

Pursuant to the improvement in processing performance of CPUs in recent years, a plurality of I/O processors are being provided to improve the access performance to the storage device. With this system, a logical volume to be accessed is fixed for each I/O processor. With this configuration, there is a problem in that the access from the CPU may be concentrated on a specific I/O processor. Thus, an object of the present invention is to provide a storage controller capable of improving the access performance to the storage device by preventing I/O access requests to the storage device from being concentrated on certain I/O processors among a plurality of I/O processor, and causing the plurality of I/O processors to issue the I/O access requests in a well balanced manner.

In order to achieve the foregoing object, the present invention is characterized in that a logical volume is divided into a plurality of stripe units, and the process to be handled by the respective plurality of I/O processors is allocated to each stripe unit. Moreover, in the present invention, a plurality of I/O processors to access a single logical volume are made to uniformly correspond with such logical volume. The first configuration of the present invention provides a storage controller for outputting an I/O request to a storage device in reply to a data I/O request in file units from an information processing device, including: a channel controller having a controller for receiving the data I/O request in file units, and a plurality of I/O processors for outputting an I/O request corresponding to the data I/O request in file units to the storage device in reply to a command from the controller; a memory for storing control information for the controller to control the I/O processor; and a logical volume accessible by the information processing device and configured in the storage device; wherein a plurality of stripe units are formed by striping the logical volume into a stripe size of an arbitrary storage capacity, and information regarding which I/O processor among the plurality of I/O processors will output the I/O request to which stripe unit among the plurality of stripe units is stored as the control information in the memory.

According to the present invention, it is possible to divide a logical volume into a plurality of stripe units, and allocate the process to be handled by the respective plurality of I/O processors to each stripe unit.

As explained above, according to the present invention, an effect is yielded in that it is possible to provide a storage controller capable of improving the access performance to the storage device by preventing I/O access requests to the storage device from being concentrated on certain I/O processors among a plurality of I/O processor, and causing the plurality of I/O processors to issue the I/O access requests in a well balanced manner.

BRIEF DESCRIPTION OF DRAWINGS

FIG. 9 is a control table showing the distribution control action of the I/O processor in the case of subjecting the I/O processor to failure degeneration;

FIG. 11 is a configuration example of a command to be issued from the CPU of the NAS engine to the I/O processor.

DETAILED DESCRIPTION OF THE PREFERRED EMBODIMENT

Figure 1:
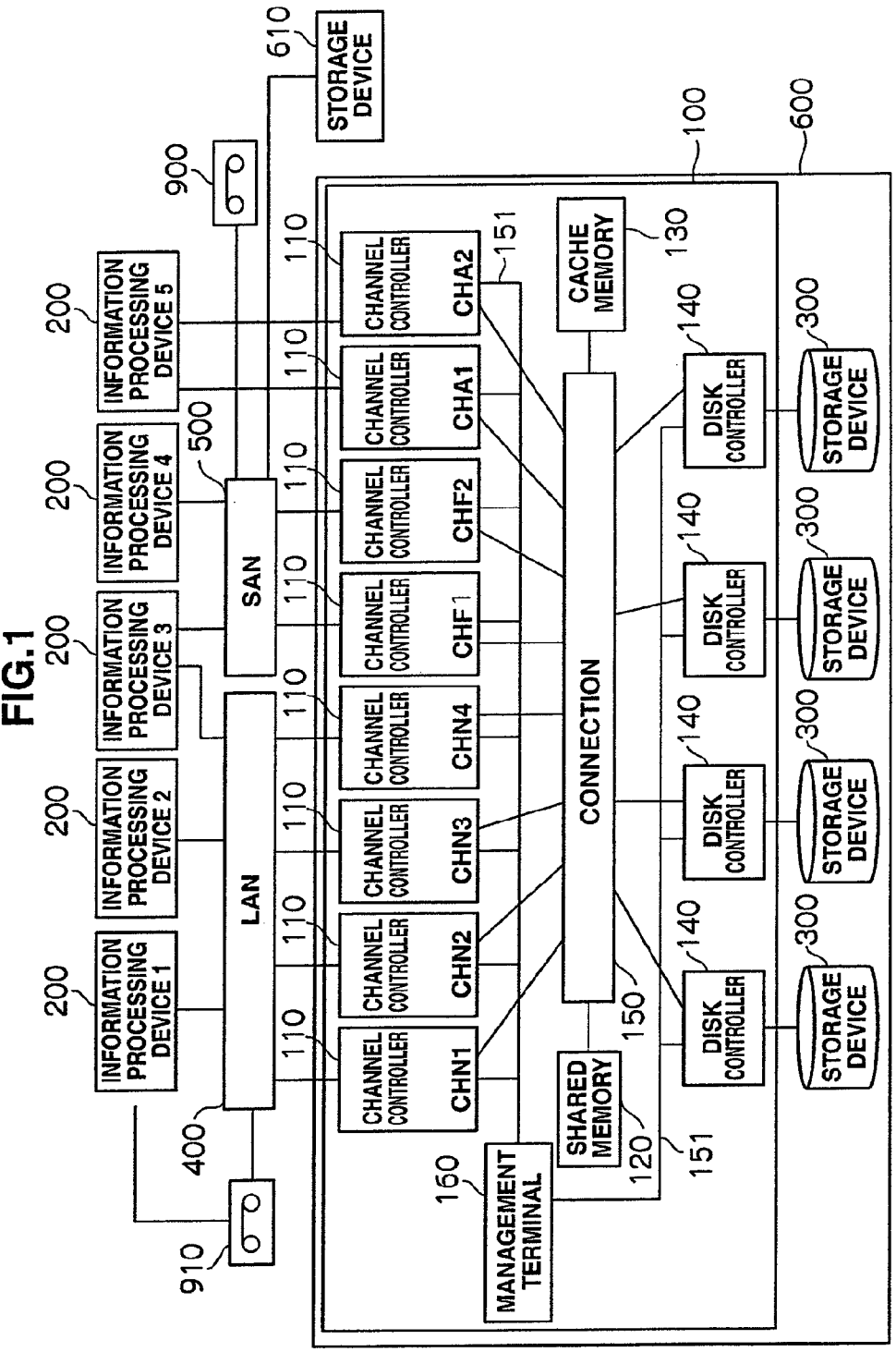
FIG. 1 is a system block diagram of the storage system according to the present embodiment.

FIG. 1 is a configuration of a storage system 600 of an embodiment pertaining to the present invention. The storage system 600 is configured by including a plurality of storage devices 300, and a storage device controller 100 for controlling the I/O to the storage devices 300 in reply to an I/O request from an information processing device 200. The information processing device 200 is a computer device including a CPU, memory and so on, and, for example, is configured from a workstation, mainframe computer, personal computer or the like. The information processing device 200 may also be configured by network-connecting a plurality of computers. The information processing device 200 is loaded with an application program that operates under the operating system. As an application program, for instance, there is an ATM system of banks and seat reservation system of airline companies.

The information processing devices 1 to 3 (200) are connected to the storage system 600 via a LAN (Local Area Network) 400. The LAN 400, for example, is a communication network such as the Ethernet (registered trademark) or FDDI, and the communication between the information processing devices 1 to 3 (200) and the storage system 600 is conducted with a TCP/IP protocol. The information processing devices 1 to 3 (200) transmit to channel controllers CHN 1 to CHN 4 (110) described later a data access request (a data I/O request in file units; hereinafter referred to as a "file access request") designating a file name to the storage system 600.

A backup device 910 is connected to the LAN 400. The backup device 910, for example, is a disk device such as an MO, CD-R or DVD-RAM, or a tape device such as a DAT, cassette tape, open tape or cartridge. The backup device 910 stores backup data of data stored in the storage device 300 by communicating with the storage device controller 100 via the LAN 400. Further, the backup device 910 is connected to the information processing device 1 (200) so as to back up data stored in the storage device 300 via the information processing device 1 (200).

The storage device controller 100 has channel controllers CHN 1 to 4 (110). The storage device controller 100 mediates the write access or read access between the information processing devices 1 to 3 (200) and backup device 910 and storage device 300 via the channel controllers CHN 1 to 4 (110) and LAN 400. The channel controllers CHN 1 to 4 (110) individually receive a file access request from the information processing devices 1 to 3 (200). In other words, the channel controllers CHN 1 to 4 (110) are individually allocated a network address (for example, an IP address) on the LAN 400, individually behave as a NAS, and each NAS is capable of providing a NAS service to the information processing devices 1 to 3 (200) as though each such NAS is an independent NAS. As a result of a single storage system 600 being configured to include channel controllers CHN 1 to 4 (110) that individually provide service as a NAS, the NAS servers which were individually operated by independent computers in the past are now consolidated into a single storage system 600. Then, the coordinated management of the storage system 600 is thereby enabled, and it is possible to streamline maintenance operations such as various configurations and controls, failure management, version management and so on.

The information processing devices 3 and 4 (200) are connected to the storage device controller 100 via the SAN 500. The SAN 500 is a network for transferring data to and from the information processing devices 3 and 4 (200) in block units, which is a data management unit in a storage area provided by the storage device 300. Communication conducted between the information processing devices 3 and 4 (200) and storage device controller 100 via the SAN 500 is generally conducted according to a fibre channel protocol. A data access request in block units (hereinafter referred to as a "block access request") is transmitted from the information processing devices 3 and 4 (200) to the storage system 600 according to the fibre channel protocol.

A SAN-compliant backup device 900 is connected to the SAN 500. The SAN-compliant backup device 900 stores backup data of data stored in the storage device 300 by communicating with the storage device controller 100 via the SAN 500.

In addition to the channel controllers CHN 1 to 4 (110), the storage device controller 100 also has channel controllers CHF 1 and 2 (110). The storage device controller 100 communicates with the information processing devices 3 and 4 (200) and SAN-compliant backup device 900 via the channel controllers CHF 1 and 2 (110) and SAN 500.

The information processing device 5 (200) is further connected to the storage device controller 100 without going through a network such as the LAN 400 or SAN 500. The example of this information processing device 5 (200), for instance, is a mainframe computer. Communication between the information processing device 5 (200) and storage device controller 100, for example, is conducted according to a communication protocol such as FICON (Fiber Connection) (registered trademark), ESCON (Enterprise System Connection) (registered trademark), ACONARC (Advanced Connection Architecture) (registered trademark) or FIBARC (Fiber Connection Architecture) (registered trademark). A block access request is transmitted from the information processing device 5 (200) to the storage system 600 according to the foregoing communication protocol. The storage device controller 100 communicates with the information processing device 5 (200) via the channel controllers CHA 1 and 2 (110).

Another storage system 610 installed at a remote location (secondary site) from the installation site (primary site) of the storage system 600 is connected to the SAN 500. The storage system 610 is used as a device of the replication destination of data in the replication function or remote copy function. Incidentally, the storage system 610 may also be connected to the storage system 600 via a communication line such as an ATM in addition to the SAN 500. In such a case, for example, a channel controller having an interface (channel extender) for using the foregoing communication line is adopted as the channel controller 110 to be connected to the SAN 500.

Like this, by mixing and installing the channel controllers CHN 1 to 4 (110), channel controllers CHF 1 and 2 (110), and channel controllers CHA 1 and 2 (110) in the storage system 600, it is possible to realize a storage system capable of connecting to different networks. In other words, this storage system 600 is a SAN-NAS integrated storage system of connecting to the LAN using the channel controllers CHN 1 to 4 (110), and connecting to the SAN 500 using the channel controllers CHF 1 and 2 (110).

The connection 150 interconnects the respective channel controllers 110, shared memory 120, cache memory 130, and respective disk controllers 140. The transmission/reception of commands or data between the channel controller 110, shared memory 120, cache memory 130 and disk controller 140 is conducted via the connection 150. The connection 150, for instance, is configured from a high-speed bus such as an ultra high-speed crossbar switch that performs data transfer by way of high-speed switching. As a result, the communication performance between the channel controllers 110 will improve considerably, and a high-speed file sharing function and high-speed failover will be enabled.

The shared memory 120 and cache memory 130 are memory devices to be shared by the channel controllers 110 and disk controllers 140. The shared memory 120 is primarily used for storing control information and commands, and the cache memory 130 is primarily used for storing data. For example, when the data I/O command received by the channel controller 110 from the information processing device 200 is a write command, the channel controller 110 writes such write command in the shared memory 120, and writes the write data received from the information processing device 200 in the cache memory 130. Meanwhile, the disk controller 140 is monitoring the shared memory 120, and when it determines that a write command has been written in the shared memory 120, it reads write data from the cache memory 130 and writes this in the storage device 300 according to the write command.

Meanwhile, when the data I/O command received by a channel controller 110 from the information processing device 200 is a read command, the channel controller 110 writes such read command in the shared memory 120, and checks whether data to be read exists in the cache memory 130. Here, when data to be read exists in the cache memory 130, the channel controller 110 reads such data from the cache memory 130 and transmits this to the information processing device 200. When data to be read does not exist in the cache memory 130, the disk controller 140 that detected a read command has been written in the shared memory 120 reads data to be read from the storage device 300 and writes this in the cache memory 130, and further writes to such effect in the shared memory 120. When the channel controller 110 detects that data to be read has been written in the cache memory 130 as a result of monitoring the shared memory 120, it reads such data from the cache memory 130 and transmits it to the information processing device 200.

The disk controller 140 converts the data access request to the storage device 300 based on a logical address designation transmitted from the channel controller 110 into a data access request based on a physical address designation, and writes data in or reads data from the storage device 300 in reply to the I/O request output from the channel controller 110. When the storage device 300 is configured in RAID, the disk controller 140 accesses data according to the RAID configuration. In addition, the disk controller 140 performs replication control or remote copy control for the purpose of replication management, backup control and prevention of data loss (disaster recovery) at the time of failure of data stored in the storage device 300.

The storage device 300 has one or more disk drives (physical volumes), and provides a storage area accessible from the information processing device 200. One or more logical volumes formed by combining the storage space of one or more physical volumes are configured in the storage area provided by the storage device 300. As the logical volume configured in the storage device 300, there is a user logical volume accessible from the information processing device 200, or a system logical volume used for controlling the channel controller 110. The system logical volume stores an operating system to be executed by the channel controller 110. Further, as the logical volume provided by the storage device 300, a logical volume accessible by the respective channel controllers 110 is allocated. Incidentally, the plurality of channel controllers 110 may share the same logical volume.

Incidentally, as the storage device 300, for example, a hard disk device, a flexible disk device or the like may be used. As the storage configuration of the storage device 300, for instance, a RAID system disk array may also be configured from a plurality of storage devices 300. Further, the storage device 300 and storage device controller 100 may be connected directly, or connected via a network. Further, the storage device 300 may be configured integrally with the storage device controller 100.

The management terminal 160 is a computer device for maintaining and managing the storage system 600, and is connected to the respective channel controllers 110 and disk controllers 140 via the internal LAN 151. As a result of operating the management terminal 160, the operator is able to configure the disk drive of the storage device 300, configure the logical volume, install micro programs to be executed by the channel controller 110 and disk controller 140, and so on.

Figure 2:
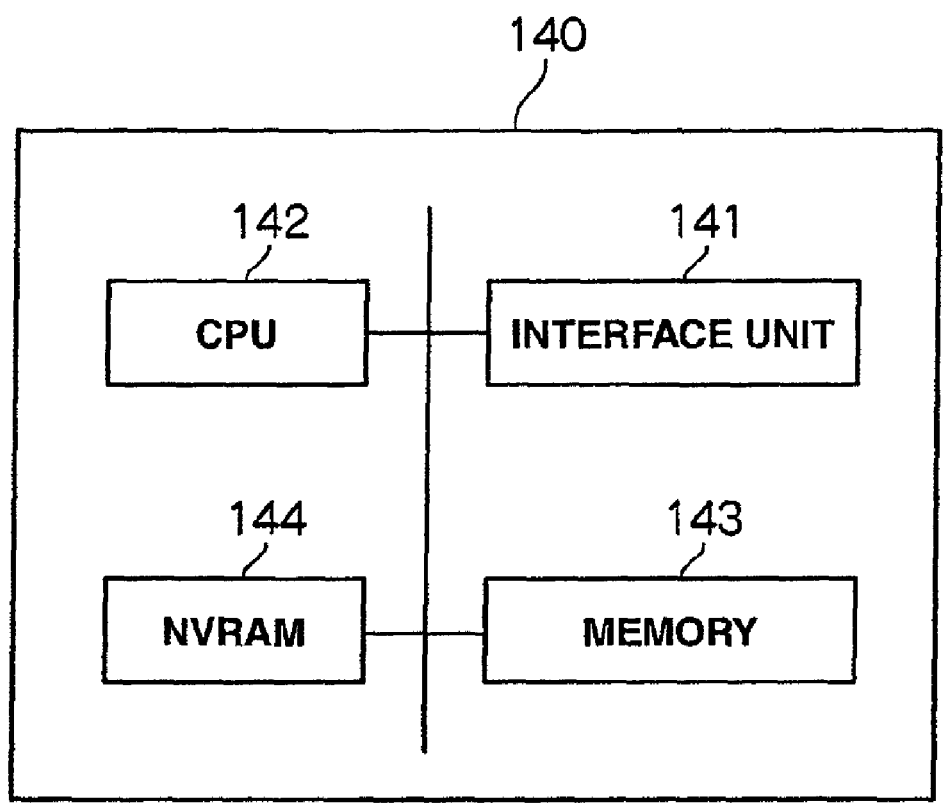
FIG. 2 is a system block diagram of the disk controller according to the present embodiment.

FIG. 2 shows a circuitry of the disk controller 140. The disk controller 140 is configured by including an interface unit 141, a CPU 142, a memory 143, and an NVRAM 144, and these are integrally formed as a unit on one or more circuit boards. The interface unit 141 has a communication interface for communicating with the channel controller 110 or the like via the connection 150 and a communication interface for communicating with the storage device 300. The CPU 142 performs the communication between the channel controller 110, storage device 300 and management terminal 160, and also performs the access control and data replication management to the foregoing storage device 300. The memory 143 and NVRAM 144 store programs and data for causing the CPU 142 to execute the various control processing described above.

Figure 3:
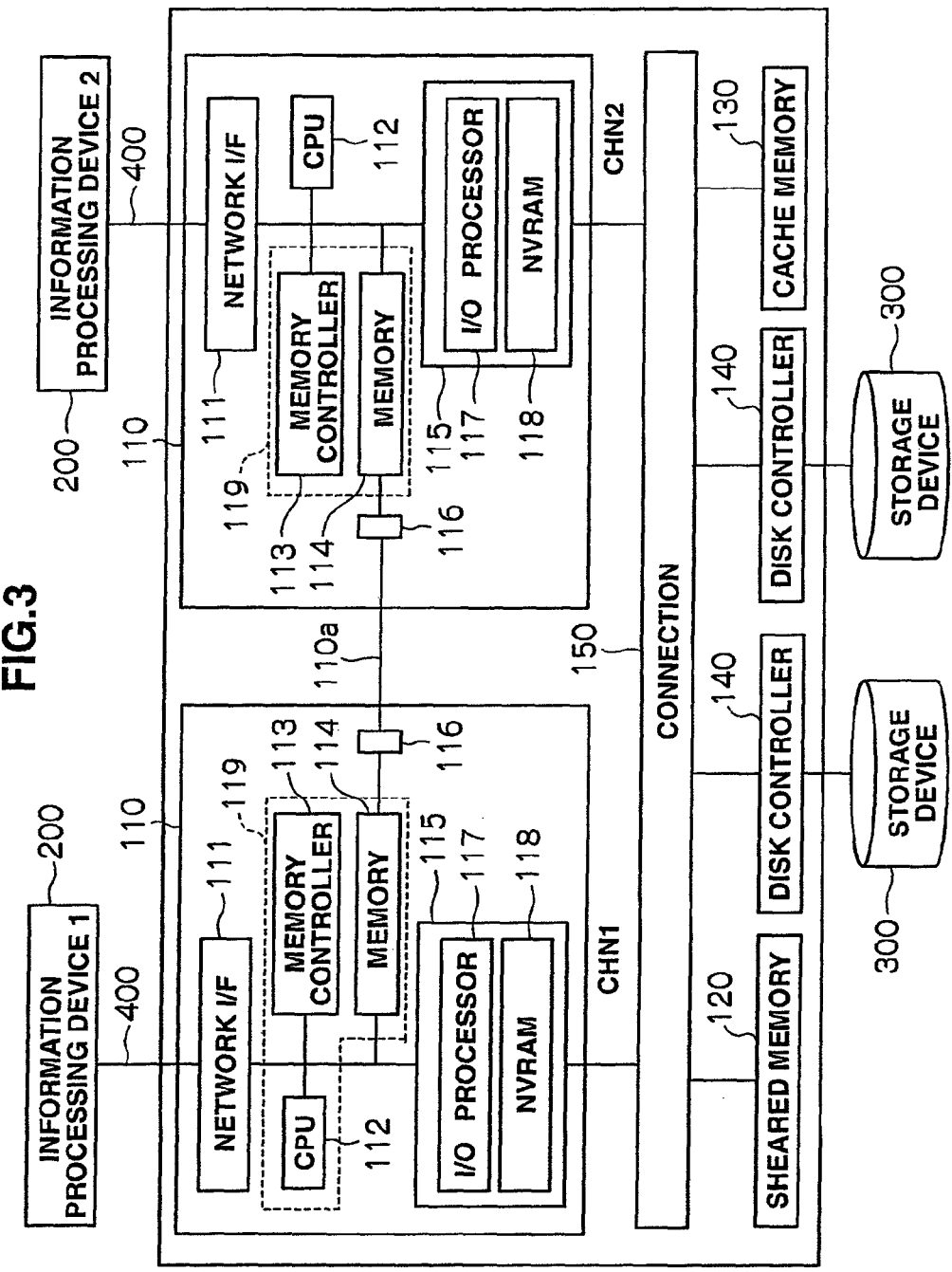
FIG. 3 is a system block diagram of the channel controller of the storage system.

FIG. 3 is a detailed connection configuration of the channel controllers CHN 1 and 2 (110). In the present embodiment, a cluster formed from the channel controllers CHN 1 and CHN 2 (110) is configured, and a cluster formed from the channel controllers CHN 3 and CHN 4 (110) is configured. Although FIG. 3 does not illustrate the detailed connection configuration of the channel controller CHN 3 and CHN 4 (110), it is the same as the connection configuration of the channel controllers CHN 1 and CHN 2 (110).

When the channel controllers CHN 1 and CHN 2 (110) receive a file access request from the information processing device 1 to 3 (200), such [channel controllers CHN 1 and CHN 2 (110)] access the storage device 300 by outputting an I/O request corresponding to the file access request to the file storage device 300 (disk controller 140) to seek the storage address, data length and so on of files. This I/O request contains the initial address of data, data length, type of access such as a write access or read access, and, in the case of a write access, write data is further contained therein. As a result, the information processing devices 1 to 3 (200) are able to read files from and write files in the storage device 300 using a file transfer protocol such as NFS (Network File System) or CIFS (Common Interface File System).

The channel controllers CHN 1 and CHN 2 (110) are respectively configured by including a network interface unit 111, a CPU (NAS processor) 112, a memory controller 113, a memory (memory module) 114, an I/O controller 115, and a translate circuit (conversion LSI) 116, and these are formed integrally as a NAS board on one or more circuit boards. The network interface unit 111 is a communication interface for communicating with the information processing device 200 based on the TCP/IP protocol, and, for example, is configured from a LAN controller or the like. Reference numeral 119 is a NAS engine, and has a CPU 112, a memory controller 113, a memory 114, as well as BIOS (Basic Input/Output System) and NVRAM.

The CPU 112 controls the CHN 110 so that it functions as a NAS board. The CPU 112 performs processing of controlling a file sharing protocol such as NFS or CIFS and TCP/IP, analyzing the file access request designating files, interconnecting data in file units and LU in the storage device 300 to control information in the memory 114 based on a mapping table, creating a data write request or read request to the LU in the storage device 300, transmitting a data write request or read request to the I/O processor 117, and so on.

BIOS, for instance, is software to be initially loaded in the memory 114 and executed during the process of activating the CPU 112 (NAS driver) upon the CHN 110 being turned on, and, for example, is stored in a nonvolatile medium such as a flash memory and loaded in the [channel controller] CHN 110. The CPU 112 is able to initialize and diagnose portions relating to the CPU 112 in the [channel controller] CHN 110 by executing software read from the BIOS into the memory 114. Moreover, by issuing a designation such as a command from the BIOS to I/O processor 117, the CPU 112 is able to read a prescribed program; for instance, an OS boot unit, from the storage device 300 into the memory 114. The read OS boot unit further operates to read the primary portions of the OS stored in the storage device 300 into the memory 114, whereby the OS is activated in the CPU 112, and, for example, it is thereby possible to execute processing as a file server. Further, the NAS engine 119 may also be loaded with an NVRAM storing a network boot loader according to a code such as PXE (Preboot eXecution Environment) so as to perform network booting.

The memory 114 stores various types of programs and data; for example, an operating system, a volume manager, a file system program, a RAID manager, an SVP manager, a file system protocol (NFS or Samba), a backup management program, a failure management program, a NAS manager, a security management program, and so on. The memory controller 113 performs memory access control to the memory 114 based on designations from the CPU 112.

The I/O controller 115 is configured by including an I/O processor 117 and an NVRAM (Non Volatile RAM) 118, and transmits and receives data and commands between the disk controller 140, cache memory 130, shared memory 120, and management terminal 160. The I/O request corresponding to the file access request is output by the I/O processor 117. The I/O processor 117, for instance, is configured from a single chip microcomputer. The I/O processor 117 controls the transfer of data write requests, data read requests and data to and from the LU in the storage device 300, and relays the communication between the CPU 112 and disk controller 140. The NVRAM 115 is a nonvolatile memory storing a program for controlling the I/O processor 119. Contents of the program stored in the NVRAM 115 can be written or rewritten based on designations from the management terminal 160 or NAS manager.

The channel controllers CHN 1 and CHN 2 (110) configuring the cluster are configured so as enable mutual data communication via a signal line 110a, and are thereby able to share data. When performing data communication between the channel controllers CHN 1 and CHN 2 (110), and, since the distance between the two is long, the problem of a signal skew will occur with a clock distribution configuration. Thus, in consideration of this problem in the present embodiment, a clock extraction configuration is adopted for the communication between the channel controllers CHN 1 and CHN 2 (110). More specifically, since the memory 114 is adopting a clock distribution configuration that operates by receiving the distribution of the clock signal from a clock generator, a configuration for converting from the clock distribution type to clock extraction type in the interface between the channel controllers CHN 1 and CHN 2 (110) has been adopted.

The data signal transferred from the memory controller 113 to the memory 114 is 8B/10B-encoded, and a clock is embedded in the data signal. The translate circuit 116 extracts an embedded clock by converting (encoding) the data signal into 10B/8B. The identification timing of data in the translate circuit 116 is based on the clock signal supplied from the clock generator. The translate circuits 116 contained in the respective channel controllers CHN 1 and CHN 2 (110) are connected via the signal line 110a. The channel controllers CHN 1 and CHN 2 (110) are able to perform data communication via the signal line 110a. For example, the memory controller 113 of the channel controller CHN 1 (110) is able to access the memory 114 in the channel controller CHN 2. In addition, the channel controllers CHN 1 and CHN 2 (110) are able to detect the failure status of the other channel controller by performing heartbeat communication via the signal line 110a. By configuring a cluster, even if a failure occurs in the channel controller 110 in the cluster, the processing that was being performed by the channel controller 110 subject to the failure can be succeeded by another channel controller 110 in the cluster.

Figure 4:
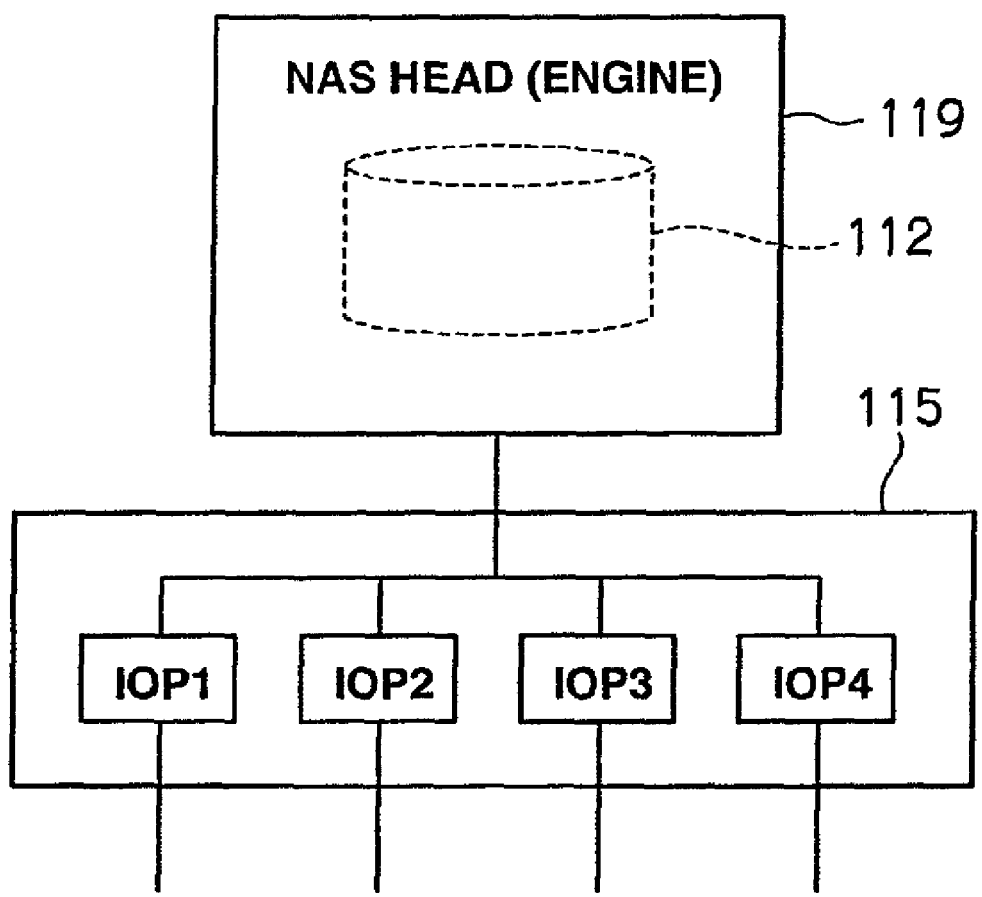
FIG. 4 is a block diagram showing that the channel controller has a plurality of I/O processors.

In FIG. 3, although the I/O processor of the I/O controller 115 was illustrated with a single block, in actuality, as shown in FIG. 4, the I/O unit 115 of the NAS board 110 is configured from a plurality of processors (IOP 1 to IOP 4) or a plurality of I/O units, and each processor is connected to the NAS engine 119, and placed under the control of the CPU 112. The CPU 112 controls each of the plurality of I/O processors IOP 1 to IOP 4 based on the control information (control table) configured in the memory 114. In other words, with the storage system pertaining to the present embodiment, the user logical volume (LU) is striped in a certain storage capacity size, the LU is configured from a plurality of stripe units, and the plurality of I/O processors IOP 1 to IOP 4 are allocated to the respective stripe units. Incidentally, the number of I/O processors to be mounted is not limited to four processors, and the control information is stored in the shared memory 120 or the storage device.

Figure 5:
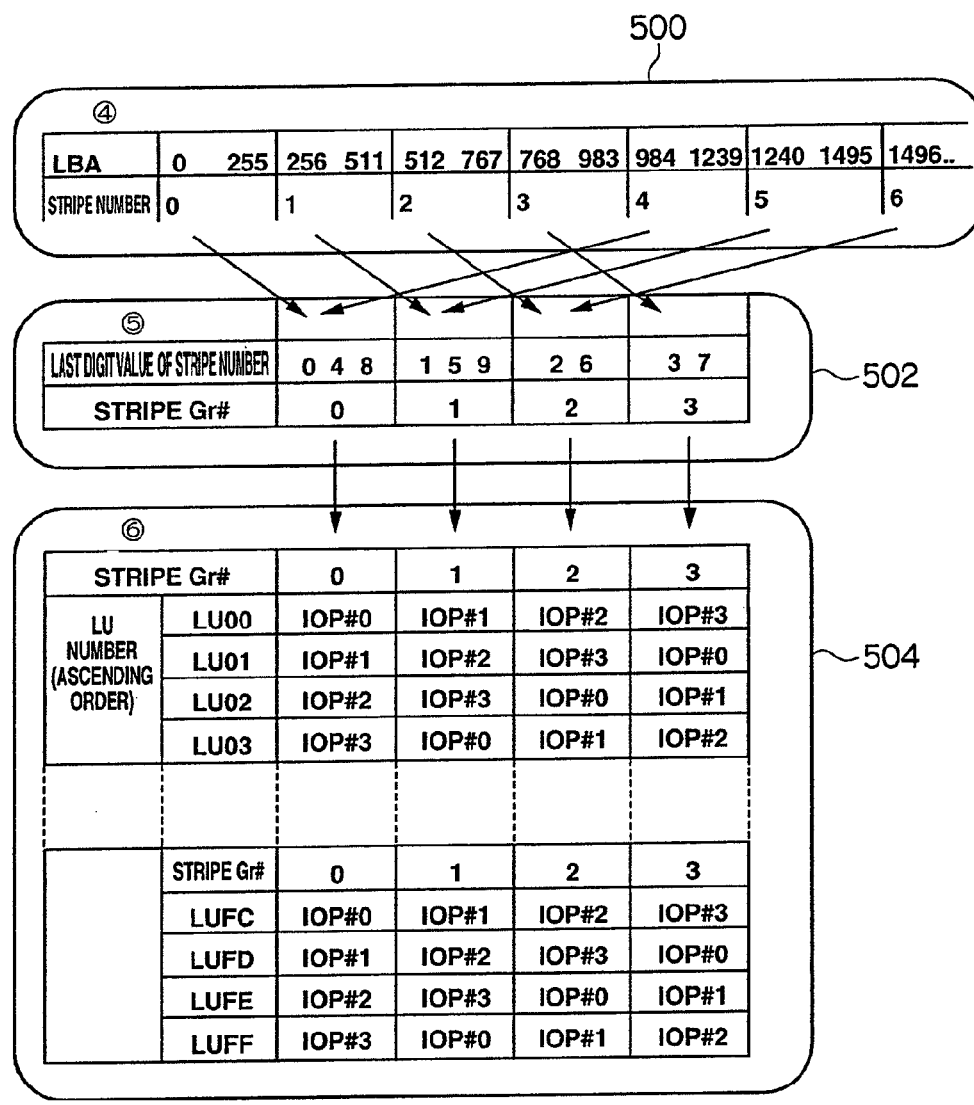
FIG. 5 is a control table showing the relationship of the stripe unit of the logical volume subject to striping, and the I/O processor.

Reference numeral 500 in FIG. 5 is a [control table] and, in a case where the cache slot size is 256 kB, shows that the LBA (Logical Block Address) of the logical volume is subject to striping in a stripe size of 256 kB. The NAS driver executed by activating the CPU 112 of the NAS engine 119 sequentially forms a stripe unit by dividing the entire LBA size of the logical volume in each stripe size. A stripe number is allocated to each stripe unit from the initial address. Incidentally, it is desirable that the stripe size is larger than the cache slot size. As a result, it is possible to avoid the cache slot competition of the cache memory among the plurality of I/O processors. This is particularly effective in a random I/O.

The NAS driver realized by the activation of the OS of the NAS engine 119 decides the I/O processor to output the I/O request for each stripe unit based on the stripe number and total number of I/O processors. Reference numeral 502 in FIG. 5 is a control table showing that a stripe number, and an I/O for outputting the I/O request to the LBA corresponding to such stripe number have been allocated. Control tables 500 and 502 in FIG. 5 are created at the activation of the NAS driver, and configured and stored in the memory 114. The NAS driver 119 refers to these control tables each time there is a file access from the host system, and decides the stripe unit (stripe number) to which the I/O request is to be output. Next, the NAS driver selects the I/O processor corresponding to the stripe number, and transmits a command to this processor for outputting an I/O request. Since the identifying information of the I/O processor is stored in the memory 114, the NAS engine 119 is able to know the number of IOPs mounted on the NAS board in advance. Moreover, the NAS engine may use a command interface similar to the SCSI standard and recognize the entire LBA size regarding each of the user logical volumes.

Figure 6:
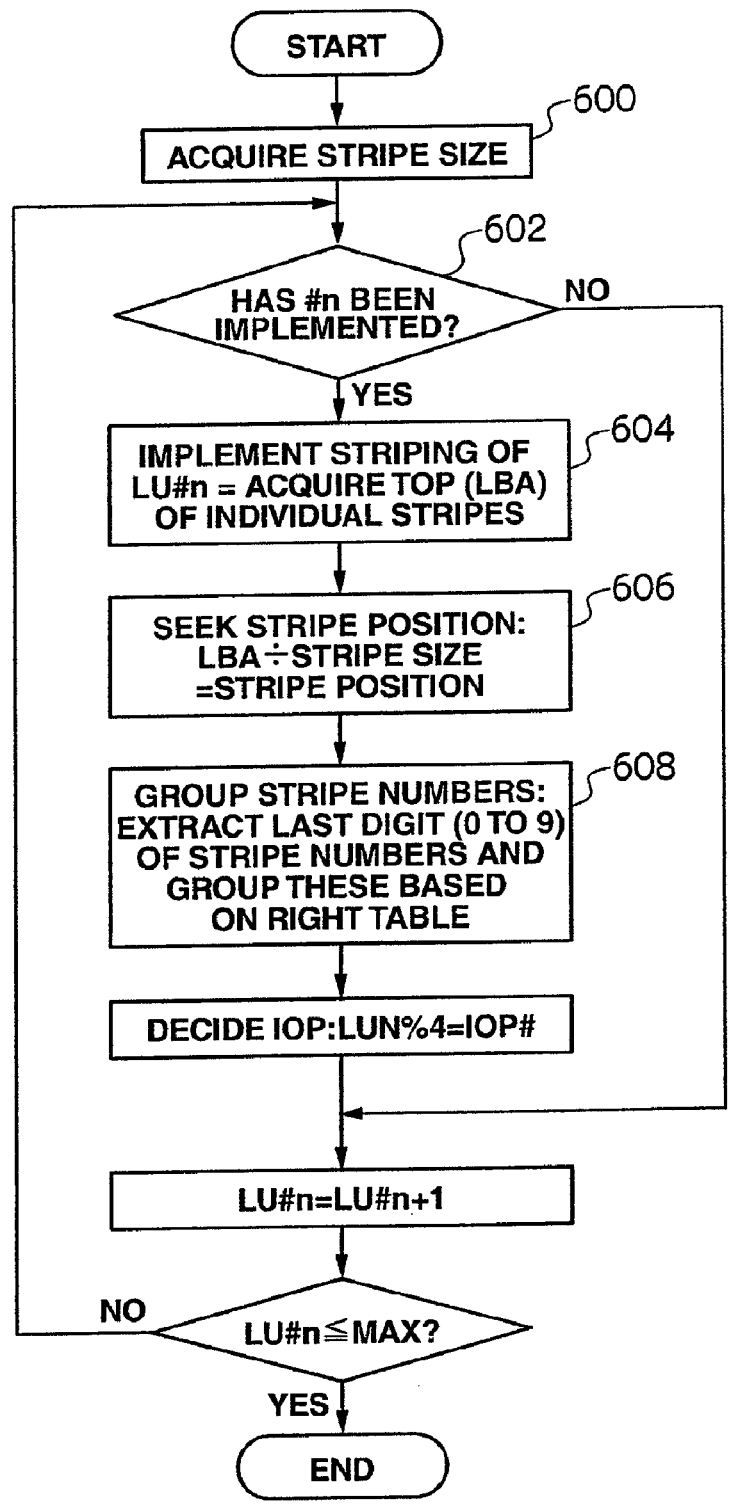
FIG. 6 is a flowchart showing the operation of the NAS engine creating the control table.

FIG. 6 is a flowchart showing the creation routine of the control tables 500 and 502 of FIG. 5, and is executed by the NAS engine 119 with the activation of the NAS driver as the turning point. The NAS engine 119 acquires the stripe size (600). This stripe size may be pre-set by a user inputting such stripe size with the management console 160, and may also be changed depending on the operational status of the I/O processor. Next, the NAS engine reads the loading information of the I/O processor, and determines whether a plurality of I/O processors are loaded in the NAS board 110 (602). This loading information is configured in the memory 114. When this determination is denied, the processing of this flowchart is ended. When this determination is affirmed, the NAS driver acquires LBA information concerning a single logical volume (LU#n), and uses the acquired stripe size to perform striping to the respective logical volumes. The NAS driver acquires the initial LBA of the individual stripe units (604). Next, the stripe position is sought. In other words, the value obtained by dividing the initial LBA of the respective stripe units by the stripe size is made to be the stripe position (606).

Next, the NAS driver groups the stripe numbers (608). For example, the [NAS driver] extracts the last digit (0 to 9) of the stripe numbers, and, as shown in the control table 502 of FIG. 5, groups the stripe units. Grouping is executed in accordance with the balance remaining after dividing the last digit of the stripe numbers with the number of I/O processors as described below, and an I/O processor is allocated in order to each group (610). The NAS driver implements this allocation processing regarding all I/O processors (612, 614). As shown with the [control table] 502 in FIG. 5, the I/O processor of IOP 0 is allocated to stripe units having a stripe number of 0, 4 or 8, the I/O processor of IOP 1 is allocated to stripe units having a stripe number of 1, 5 or 9, the I/O processor of IOP 2 is allocated to stripe units having a stripe number of 2 of 6, and the I/O processor of IOP 3 is allocated to stripe units having a stripe number of 3 or 7.

When the NAS engine is to make the I/O processor output a random I/O, it decides the stripe group to which the LBA of the output destination of the random I/O has been allocated, and orders the output of the I/O request to the I/O processor allocated to this stripe group. The I/O processor that received this notice outputs the I/O request to the target LBA. In this example, since a plurality of I/O processors outputting an I/O request can be allocated to a single logical volume, a plurality of processors can be operated in parallel as a result of avoiding the output load of the I/O request from being concentrated on a specific processor. In other words, a plurality of random I/Os can be processed simultaneously with a plurality of I/O processors. Further, a single I/O processor is able to allocate an I/O request to a plurality of logical volumes.

Next, it is the same in the case of the NAS engine outputting a sequential I/O to the I/O processor, and, as shown in the [control table 500] of FIG. 5, the stripe position changes each time the logical volume address becomes larger, and the I/O processor corresponding to such stripe number is selected in order. Therefore, even if it is a sequential I/O, the I/O load will not be concentrated on a specific I/O processor, and it is possible to operate a plurality of processors in parallel.

The control table 504 in FIG. 5 shows another example for allocating the I/O processors. As described with the [control table] 502 above, if the stripe group (Gr#) and I/O processor are uniquely associated, the same I/O processor will be associated with the same LBA having different logical volumes. For example, the request destination I/O processor will constantly be the same regarding the stripe group 0 of LUN (logical volume number) 00 to LUN 03. In such a case, with an I/O pattern of accessing a plurality of logical volumes in parallel from the top, the I/O will be concentrated on a single I/O processor, and the processing efficiency of I/O requests will deteriorate. Thus, as shown in the [control table] 504, in consequence with the increase in the number of the LUN, the I/O processors allocated to the same stripe group are made to be shifted one by one. In other words, all I/O processors are cyclically shifted (IOP#0→IOP#1→IOP#2→IOP#3→IOP#0→ . . . ). As a result, even with an I/O pattern of accessing a plurality of logical volumes in parallel from the top, the I/O requests can be dispersed to a plurality of I/O processors, and the I/O processing efficiency can be improved thereby.

Figure 7:
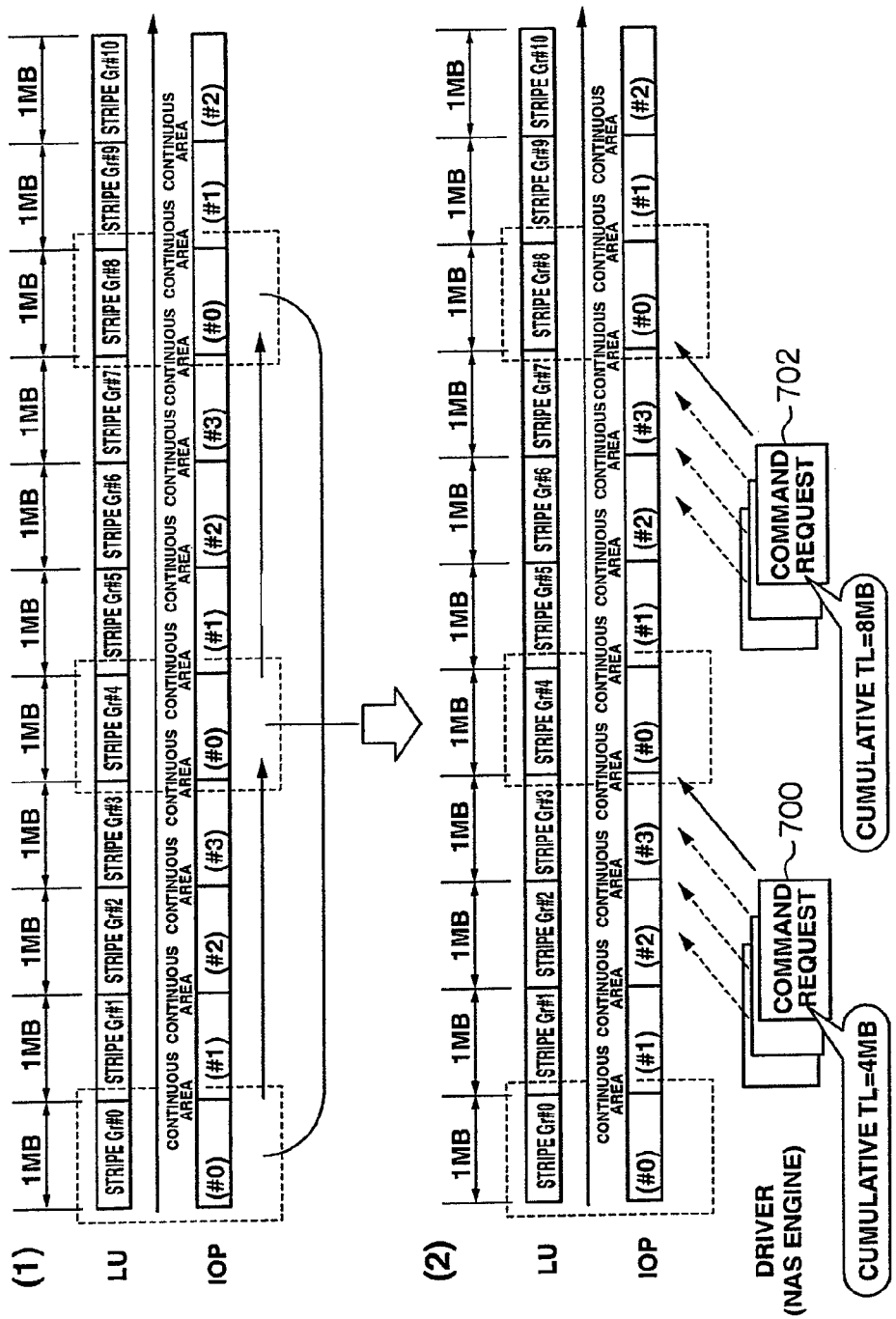
FIG. 7 is a control table showing the control relationship of the logical volume subject to striping and the I/O processor in a sequential I/O access.

FIG. 7(2) shows another allocation control system of the I/O processor. This system aims to improve the learning function of the I/O processor in a sequential I/O access. When a sequential I/O access is applied to the control table illustrated in FIG. 7(1), a sequential I/O less than the stripe unit length can be processed with the same I/O processor. Nevertheless, in the case of a sequential I/O access exceeding the stripe size, the I/O request must be processed with another I/O processor, and the learning operation of a single I/O processor will be interrupted. For example, when taking a look at the I/O processor IOP#0, the I/O access will be interrupted every 4 MB, and there is a problem in that the I/O processor is not able to obtain a learning effect of prefetching the logical volume subject to a sequential I/O.

Thus, when the NAS engine (NAS driver) 119 is to convert the file access request from the information processing device into a block address, it accumulates the transfer size of the I/O request from the time the sequential I/O request is generated each time a command queue is generated, includes the cumulative transfer size (cumulative TL) 702 in the information 700 of the command queue as learning information and outputs this to the I/O processor. FIG. 11 shows a configuration example of the I/O access request (command queue) sent from the CPU 112 to the I/O processor 117. The queue type and operation code distinguish a read request or write request, LBA is an address group on the LU referred to by the I/O processor, TL is the transfer size, and cumulative TL is the cumulative transfer size.

Figure 12:
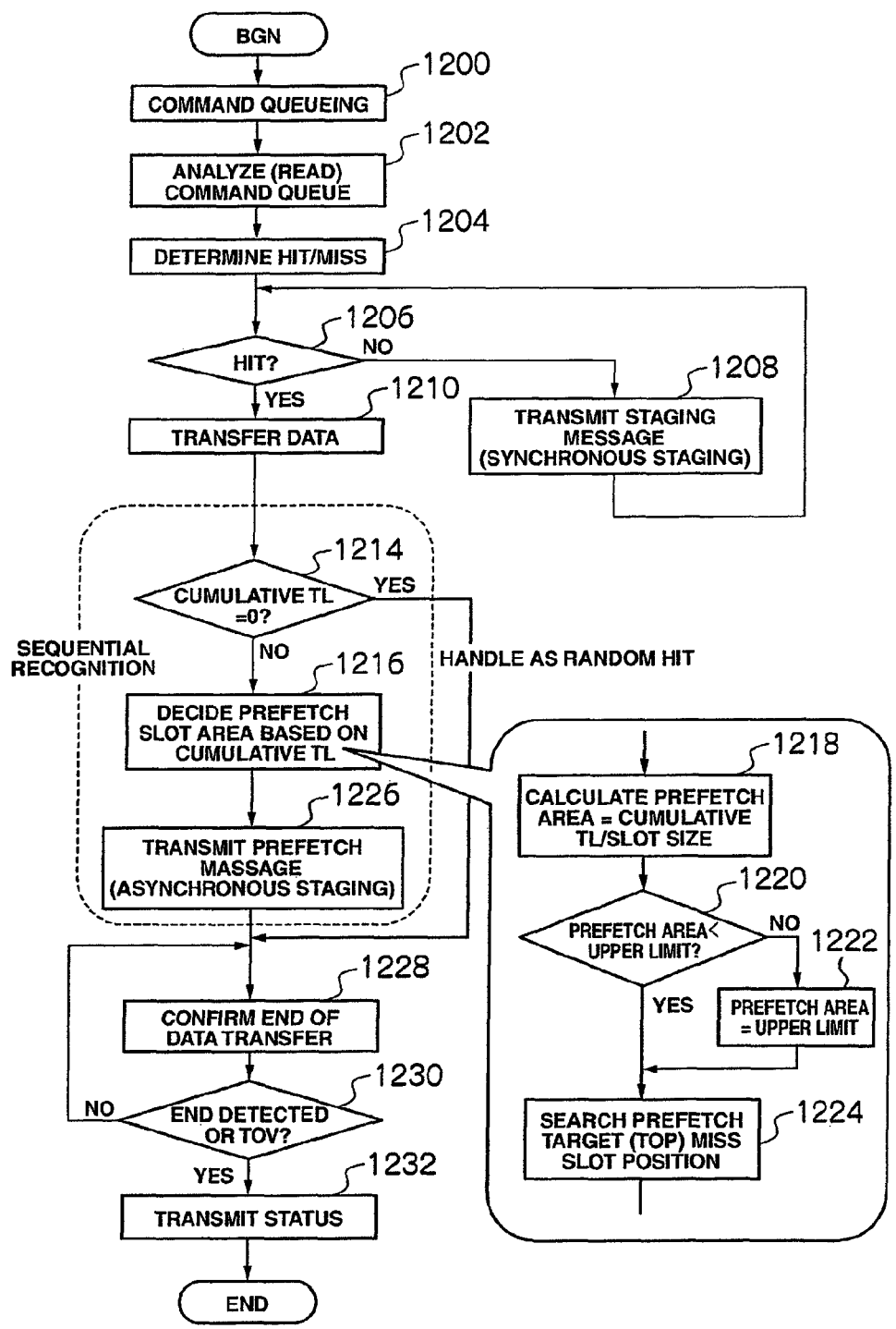
FIG. 12 is a flowchart showing the learning processing of the I/O processor to be executed by the I/O processor.

In FIG. 7(2), the I/O request to the LBA in the area of stripe position "4" of the logical volume is executed based on the I/O processor IOP#0 that received a command from the NAS engine. Here, 4 MB is included as the cumulative transfer size (TL) in the command queue 700 to the I/O processor #0. A cumulative transfer size (TL) 8 MB is included in the command queue 702 to the same I/O processor IOP#0. Therefore, the I/O processor IOP#0, by referring to the cumulative transfer size of the command queue sent to itself, it is possible to prefetch (learn) the logical block address of the logical volume included in the previous stripe group from the cumulative transfer size. FIG. 12 is a flowchart showing the learning operation of the I/O processor focusing on a single I/O processor among the plurality of I/O processors. Foremost, at step 1200, the same target (I/O processor) receives a plurality of commands from the initiator (CPU), and inputs this into a queue (command queuing). At step 1202, the I/O processor analyzes the command queue. At step 1204, the I/O processor refers to the control management information of the local memory or shared memory of the NAS engine, and refers to the cache control information to determine the cache hit/miss (step 1206). In the case of determining the cache hit/miss, the routine proceeds to step 1208, and the I/O processor transmits a request (staging message) to the disk controller 140 for transferring data designated with the read order LBA to the cache memory. Synchronous staging means to continue staging processing until the data in the cache memory is subject to staging.

After step 1208 is ended, step 1206 is executed once again, and if a cache hit is determined, the data of the cache-hit block address is transferred from the cache memory to the local memory 114 (refer to FIG. 3) of the NAS (1210). In FIG. 12, reference numeral 1212 is a portion corresponding to the learning function of the I/O processor. The I/O processor refers to the cumulative transfer size (refer to cumulative TL/FIG. 11) of the command queue, and determines "cumulative TL=0 or cumulative TL≠0?" (1214). The CPU 112 (refer to FIG. 3) converts the file access request from the information processing device 200 into a block access request, and compares the block address between the file access request and the subsequent file access request. When there is continuity in the block address, the cumulative TL from the block address in which such continuity started is calculated, and this is included in the I/O request to the I/O processor.

When cumulative TL=0, since the command is a random I/O access, the learning function is not executed. When cumulative TL≠0, since this is a sequential I/O access, the I/O processor is able to prefetch the logical volume. At step 1216, the I/O processor decides the slot area on the LU to be prefetched based on the cumulative TL. In other words, as shown in step 1218, the (cumulative LU/cache slot size) is calculated, and the slot area to the LBA on the logical volume to be prefetched is decided. The block address of the prefetched slot area is prefetched from the block address of the data transferred by the I/O processor. Or, the slot area of the prefetch area may be prefetched from the address subject to a cache hit/miss during the prefetch process.

At step 1220, the prefetch area and upper limit are compared. At step 1222, when the prefetch area exceeds the upper limit, the prefetch area is compulsorily configured as the upper limit, the routine subsequently proceeds to step 1224, the prefetch area is decided, and the top position to be prefetched is searched.

At step 1226, the I/O processor issues a prefetch message to the disk controller. The disk controller that received the message reads the data of the block address to be prefetched, and asynchronously stages this to the cache memory. The data transfer from the cache memory to the local memory 114 (FIG. 3) of the NAS engine 119 is executed by the DMA not shown. The I/O processor checks the command from the DMA, and checks whether the data transfer has ended or is a timeout (TOV) (1228, 1230). Next, the I/O processor transmits a status representing the completion of execution of the command queue to the CPU 112, and ends the processing sequence (1232). The foregoing learning processing is not limited to a specific I/O processor, and can be executed with all I/O processors.

Figure 8:
FIG. 8 is a control table showing the distribution control action of the I/O processor in the case of subjecting the I/O processor to maintenance degeneration.

Next, the control rule in the case of subjecting the I/O processor to maintenance degeneration is explained. As this kind of maintenance degeneration, there is a case of exchanging the micro program controlling the I/O processor online. This is explained with reference to the control table of FIG. 8. Upon performing maintenance degeneration, among the four I/O processors, the I/O processors (IOP 0), (IOP 2) specified by an even-numbered ID is obstructed and thereafter recovered, and, subsequently, the I/O processors (IOP 1), (IOP 3) specified by an odd-numbered ID is obstructed and thereafter recovered. Upon obstruction, the I/O processor (IOP 0) is substituted with the I/O processor (IOP 1), and the I/O processor (IOP 2) is substituted with the I/O processor (IOP 3). When obstructing an odd-numbered I/O processor, this is substituted with an even-numbered I/O processor in a reverse relationship. Incidentally, when subjecting a certain I/O processor to failure degeneration, another processor may be uniformly allocated to the stripe group allocated to the obstructed processor.

Figure 10:
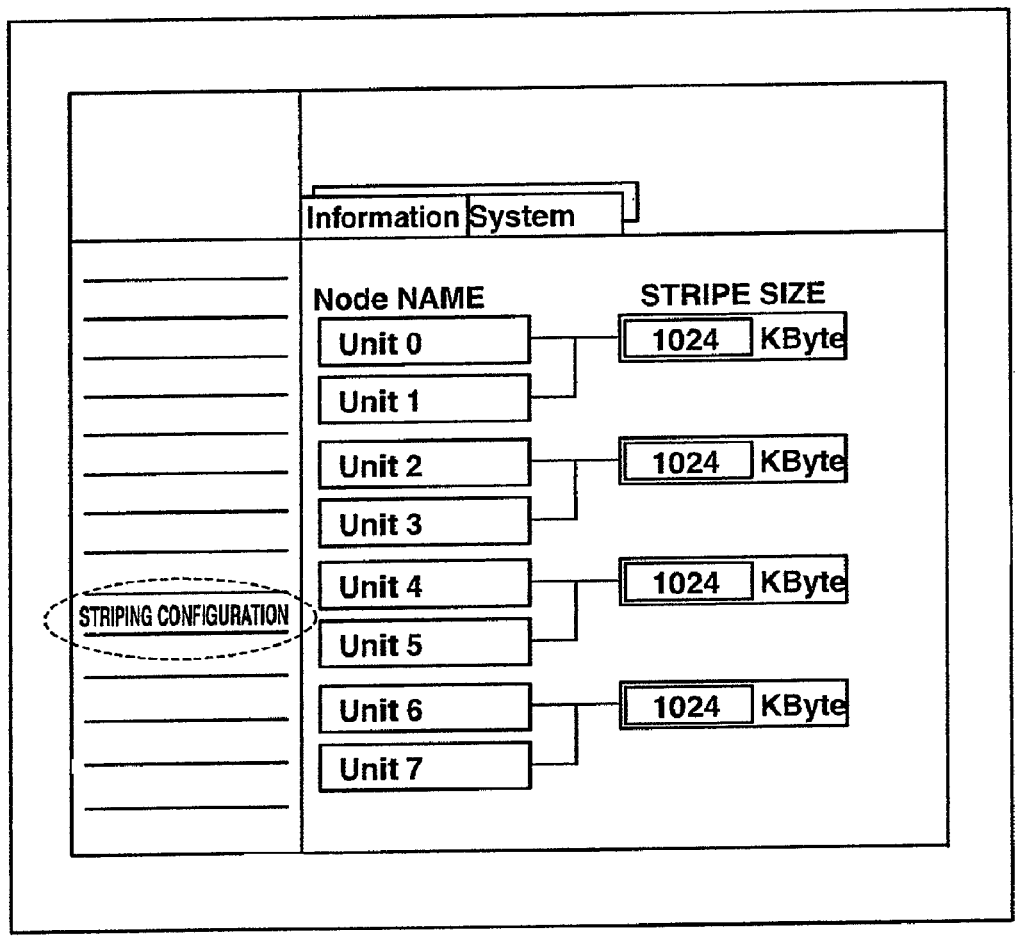
FIG. 10 is a configuration screen of the management terminal for the administrator to configure the stripe size.

FIG. 10 is an input screen of the management terminal for the administrator to input the stripe size of the logical volume in the management terminal 160. This input screen is configured with a user interface, and, when the configuration of striping is selected, a stripe size can be configured for each pair of NAS boards (Unit#) configured in a cluster. A smaller stripe size is suitable for a random I/O since the I/O processor will not be bound by a specific I/O request. Meanwhile, with a sequential I/O, it is preferable to enlarge the stripe size for the I/O processor to efficiently process a sequential I/O request.

What is claimed is:

1. A storage controller, being adapted to be coupled to an information processing device via a local area network (LAN), comprising:
   a controller for receiving a file access request in file units from the information processing device via the LAN and converting the file access request into a block access request;
   a plurality of Input/Output (I/O) processors for receiving the block access request from the controller, and controlling to read/write data from/to a logical volume configured by a plurality of storage areas of a plurality of storage devices in reply to the block access request from said controller; and
   a cache memory for storing data transferred between the plurality of I/O processors and the plurality of storage devices,
   wherein the controller manages a plurality of stripe units formed by striping said logical volume into a stripe size of arbitrary storage capacity, each of the plurality of stripe units allocated to one of the plurality of I/O processors so that each of the plurality of I/O processors executes to read/write data corresponding to a different stripe unit of the plurality of stripe units,
   wherein the controller transfers the block access request to one of the plurality of I/O processors allocated to one of the plurality of stripe units corresponding to a block address identified by the block access request, for executing the block access request converted from the file access request, in response to receiving the file access request,
   wherein, if the controller identifies that the block access request converted from the file access request is a portion of a sequential access request, based on the file access request and a subsequent file access request, the block access request includes cumulative transfer information related to a plurality of the logical block addresses corresponding to two or more of the plurality of stripe units, at least one of the two or more of the plurality of stripe units being allocated to another one of the plurality of I/O processors, wherein the one of the plurality of I/O processors, which received the block access request, executes not only to read/write data from/to the block address, identified by the block access request, and corresponding to the one of the plurality of stripe units, but also to prefetch data, corresponding to the plurality of the logical block addresses corresponding to the two or more of the plurality of stripe units, from the plurality of storage devices to the cache memory based on the cumulative transfer information included in the block access request, data of the at least one of the two or more of the plurality of stripe units allocated to another one of the plurality of I/O processors is executed to read/write by the another one of the plurality of I/O processors, wherein when the cumulative transfer information is equal to zero, the one of the plurality of I/O processors does not prefetch data, wherein when the cumulative transfer information is not equal to zero, the one of the plurality of I/O processors does prefetch data such that the one of the plurality of I/O processors decides a size and an area of a stripe on the storage device to be prefetched based on the cumulative transfer information, wherein the controller is a network attached storage (NAS) head and is connected to the plurality of I/O processors that execute processing for writing to the cache memory, wherein the processing performed by each I/O processor handles a different stripe group, wherein, when a sequential I/O access exceeding the stripe size occurs, the NAS head requests a certain I/O processor to execute processing for the stripe group, and the NAS head sends an accumulated transfer size of the sequential I/O access from the time the sequential I/O access occurs, wherein the certain I/O processor prefetches the stripe group, for which processing is performed by another I/O processor, to the cache memory, wherein when the cumulative transfer information is not equal to zero, the one of the plurality of I/O processors that does prefetch data decides a size and an area of a stripe on the storage device to be prefetched based on the cumulative transfer information including calculating a cumulative stripe size and deciding an area of the stripe at a Logical Block Address (LBA) to be prefetched, comparing the prefetch stripe area and upper limit, and when the prefetch stripe area does not exceed the upper limit, setting the prefetch stripe area as the upper limit, and wherein when the number of the LUN is increased, the I/O processors allocated to the same stripe group are made to be shifted one by one, thereby preventing I/O processing from being concentrated on a single I/O processor when the same I/O processor is associated with the same LBA having different logical volumes.

2. The storage controller according to claim 1, wherein said stripe size of arbitrary storage capacity is of a cache slot size or larger.

3. The storage controller according to claim 1, wherein, with activation of a control driver of said controller, the control driver forms the plurality of stripe units and allocates each of the plurality of stripe units to one of the plurality of I/O processors based on said stripe size and block address size of said logical volume.

4. The storage controller according to claim 1, wherein said stripe size can be changed with a management console.

5. The storage controller according to claim 1, wherein, when one of said plurality of I/O processors is obstructed, the obstructed I/O processor is substituted with another I/O processor that is not obstructed.

6. A data control method for a storage controller adapted to be coupled to an information processing device via a local area network (LAN), the storage controller comprising a controller for receiving a file access request in file units from the information processing device via the LAN and converting the file access request into a block access request, and a plurality of Input/Output (I/O) processors for receiving the block access request from the controller, and controlling to read/write data from/to a logical volume configured by a plurality of storage areas of a plurality of storage devices in reply to the block access request from said controller, and a cache memory for storing data transferred between the plurality of I/O processors and the plurality of storage devices, the data control method comprising:

managing, by the controller, a plurality of stripe units formed by striping said logical volume into a stripe size of arbitrary storage capacity, each of the plurality of stripe units allocated to one of the plurality of I/O processors so that each of the plurality of I/O processors executes to read/write data corresponding to different stripe unit of the plurality of stripe units;

transferring, by the controller, the block access request to one of the plurality of I/O processors allocated to one of the plurality of stripe units corresponding to a block address identified by the block access request, for executing the block access request converted from the file access request, in response to receiving the file access request;

setting, by the controller, cumulative transfer information related to a plurality of the logical block addresses corresponding to two or more of the plurality of stripe units into the block access request, if the controller identifies that the block access request converted from the file access request is a portion of a sequential access request, based on the file access request and a subsequent file access request, at least one of the two or more of the plurality of stripe units being allocated to another one of the plurality of I/O processors; and executing, by the one of the plurality of I/O processors the received block access request, not only to read/write data from/to the block address, identified by the block access request, and corresponding to the one of the plurality of stripe units, but also to prefetch data, corresponding to the plurality of the logical block addresses corresponding to the two or more of the plurality of stripe units, from the plurality of storage devices to the cache memory based on the cumulative transfer information included in the block access request, data of the at least one of the two or more of the plurality of stripe units allocated to another one of the plurality of I/O processors is executed to read/write by the another one of the plurality of I/O processors, wherein when the cumulative transfer information is equal to zero, the one of the plurality of I/O processors does not prefetch data, wherein when the cumulative transfer information is not equal to zero, the one of the plurality of I/O processors does prefetch data such that the one of the plurality of I/O processors decides a size and an area of a stripe on the storage device to be prefetched based on the cumulative transfer information, wherein the controller is a network attached storage (NAS) head and is connected to the plurality of I/O processors that execute processing for writing to the cache memory, wherein the processing performed by each I/O processor handles a different stripe group, wherein, when a sequential I/O access exceeding the stripe size occurs, the NAS head requests a certain I/O processor to execute processing for the stripe group, and the NAS head sends an accumulated transfer size of the sequential I/O access from the time the sequential I/O access occurs, wherein the certain I/O processor prefetches the stripe group, for which processing is performed by another I/O processor, to the cache memory, wherein when the cumulative transfer information is not equal to zero, the one of the plurality of I/O processors that does prefetch data decides a size and an area of a stripe on the storage device to be prefetched based on the cumulative transfer information including calculating a cumulative stripe size and deciding an area of the stripe at a Logical Block Address (LBA) to be prefetched, comparing the prefetch stripe area and upper limit, and when the prefetch stripe area does not exceed the upper limit, setting the prefetch stripe area as the upper limit, and wherein when the number of LUN is increased, the I/O processors allocated to the same stripe group are made to be shifted one by one, thereby preventing I/O processing from being concentrated on a single I/O processor when the same I/O processor is associated with the same LBA having different logical volumes.

7. The data control method according to claim 6, wherein said stripe size of arbitrary storage capacity is of a cache slot size or larger.

8. The data control method according to claim 6, further comprising:
with activation of a control driver of said controller, forming, by the control driver, the plurality of stripe units; and
allocating, by the control driver, each of the plurality of stripe units to one of the plurality of I/O processors based on said stripe size and block address size of said logical volume.

9. The data control method according to claim 6, wherein said stripe size can be changed with a management console.

10. The data control method according to claim 6, further comprising:
substituting, when one of said plurality of I/O processors is obstructed, the obstructed I/O processor with another I/O processor that is not obstructed.

* * * * *